United States Patent [19] [11] Patent Number: 5,452,445
Hallmark et al. [45] Date of Patent: Sep. 19, 1995

[54] TWO-PASS MULTI-VERSION READ CONSISTENCY

[75] Inventors: Gary Hallmark, San Carlos; Roger Bamford, Woodside, both of Calif.

[73] Assignee: Oracle Corporation, Redwood Shores, Calif.

[21] Appl. No.: 876,626

[22] Filed: Apr. 30, 1992

[51] Int. Cl.⁶ .............................................. G06F 15/40
[52] U.S. Cl. .............................. 395/600; 364/DIG. 1; 395/650
[58] Field of Search ................. 395/600, 550, 575, 650

[56] References Cited

U.S. PATENT DOCUMENTS

| 5,140,689 | 8/1992 | Kobayashi | 395/575 |
| 5,212,788 | 5/1993 | Lomet et al. | 395/600 |
| 5,280,612 | 1/1994 | Lorie et al. | 395/600 |
| 5,293,627 | 3/1994 | Kato et al. | 395/550 |

FOREIGN PATENT DOCUMENTS 0456492 11/1991 European Pat. Off. .
0458564 11/1991 European Pat. Off. .

OTHER PUBLICATIONS

M. Singhal et al. "A Concurrency Control Algorithm and its Performance for Replicated Database Systems." P. 141, par: Timestamps.; p. 142, column 1, line 17–p. 143, column 1, line 54 (May 19, 1986) 6th International Conference on Distributed Computing Systems, Cambridge, U.S.

N. Soparkar et al. "Failure–Resilient Transaction Management in Multidatabases." P. 31, column 2, line 10–p. 33, column 2, line 10 (Dec., 1991) Computer vol. 24, No. 12, Long Beach, U.S.

Primary Examiner—Thomas G. Black
Assistant Examiner—Cuan Pham
Attorney, Agent, or Firm—Hecker & Harriman

[57] ABSTRACT

The present invention describes a method and apparatus that forces all parts of an update transaction to commit automatically using a two-phase commit. The present invention uses the two-phase commit messages to negotiate a system commit number (SCN) that is then recorded on each of the nodes as the logical point in time that the distributed transaction committed. The two-phase commit scheme of the present invention consists of a "prepare" phase and a "commit" phase. The transaction in the distributed database environment involves multiple participants (databases). In the prepare phase, one of the N database participants is selected as the "commit point." The commit point includes the log into which the information is written that states the transaction has committed. The remaining N−1 participants enter a "prepare phase." In the prepare phase, the prepare participants lock their databases and enter a state in which they are ready to roll back or commit to the transaction. The mid-point of the two-phase commit is the point at which the commit point database (nth participant) writes the commit transaction to its log. In the second phase, the remaining participants are informed to commit the transaction and release locks that have been set.

20 Claims, 5 Drawing Sheets

TWO-PASS MULTI-VERSION READ CONSISTENCY

BACKGROUND OF THE INVENTION

1. FIELD OF THE INVENTION

This invention relates to the field of distributed databases.

2. BACKGROUND ART

A database is an ordered collection of data. A database system allows one or more data users, referred to as "clients" to add to, change, read from, delete, and/or otherwise manipulate the data of the database. A database management system is utilized to control the storage, retention and retrieval of data by clients in a database.

In a computer system, the database is often stored on a permanent storage system, such as a magnetic, optical, or magneto-optical disk drive. The term "permanent storage system" refers to a storage system that is used to retain data over long periods of time, in spite of power interruptions and some other failures. A disk dive is an example of such a permanent storage system. If data is stored in a nonvolatile memory, such as on a Winchester disk drive, and the disk drive is turned off or otherwise powered down and then turned back on, the data is still available. This is in contrast to temporary storage systems, such as most dynamic random access memory (DRAM). If data is stored in a typical DRAM system (without battery power), and the DRAM is turned off and then turned back on, the data is no longer available.

A client in a computer implemented database may be a human user, a processor, or a program executed on a processor. A client is any entity that can make a "transaction" with the database. A transaction is a sequence of operations that allow a client access to the database to read data, delete data, add new data, update or modify existing data. A transaction begins with an operation referred to as BEGIN operation and ends with either a COMMIT operation or a ROLLBACK operation. A COMMIT operation signifies the completion of a successful transaction. A ROLLBACK operation signifies the unsuccessful termination of a transaction.

It is desired for a database system to provide "consistency", "concurrency", "atomicity", and "durability". Consistency is the state in which two or more values in a database that are required to be in agreement with each other, are in fact in agreement. When transactions are executed one at a time, consistency is preserved. Concurrency is the state in which the sequence of execution of transactions, even if the transactions are executed at the same time, (such that various statements from different transactions are executed in an interleaved fashion), the database system controls the execution so that consistency is preserved. Atomicity of a transaction is when all of the statements of a transaction take effect or none of them do. Durability means that the effects of a transaction must persist across failures of the system components.

To provide data consistency during write and read operations, a method of "locking" the database to prevent other transactions is utilized. In a single database, one type of locking is referred to as "share locks." A share lock locks a block of data that is being accessed until it is no longer being accessed, (the lock may be released before the end of a transaction). For example, during a read operation, the data is locked so that no other client can write to that data. Such a locking scheme limits activity on the database, but provides for low concurrency and high consistency. Another method is known as "release share lock." In a release share lock scheme, the data is locked when a read data operation is initiated. After the data item has been read, the transaction ending, the lock is removed. A third scheme is referred to as "not get share locks." In this scheme, the current contents of a database are read and it's possible that a transaction might see uncommitted data. Therefore, a transaction cannot be confident of the accuracy of the data that is being read.

Another scheme is known as "exclusive locks". Exclusive locks are acquired when data is updated. The following is a matrix that describes lock compatibility.

|  | Data locked in Share | Data locked in Exclusive |
| --- | --- | --- |
| Want share lock | OK | Wait |
| Want exclusive lock | Wait | Wait |

Another scheme, utilized by the assignees of the present invention, does not utilize share locks, yet still provides a consistent version of the database during read operations. The scheme provides more correct data than the release share lock and not get share lock schemes without sacrificing concurrency. This scheme permits a read operation to see only committed data from other transactions, and any uncommitted changes made by the transaction containing the read operation. That is, the transaction sees a "snapshot" of the database as of a certain point in time. This is accomplished by implementing "system commit numbers." Each time a transaction is committed it is assigned a "system commit number." A system commit number is a logical value that increases with time. The system commit number is incremented or advanced each time a transaction commits, so that it reflects the logical order of the transactions progressing the database from one state to another. Before each statement in a transaction is executed, the current system commit number is saved and used to define a transaction-consistent state for all reads within the statement, so that even as other transactions are modifying the database and committing concurrently, changes made by other transactions during a statement's execution are not seen. When a transaction is explicitly declared read-only, the current system commit number is saved and used to define a transaction-consistent state for all reads within the transaction. As noted, this prevents a transaction from seeing data that is not committed (i.e., potentially changed or false data). It also prevents reads within a statement or an explicit read-only transaction from seeing changes that were committed after the statement or read only transaction started. This scheme only requires a wait when a transaction is attempting to update a data block but another transaction already has an exclusive lock.

The use of the system commit number scheme is effective in nondistributed database systems, that is, a database with a single data resource. However, it has not been effective in the case of a distributed database. In a distributed database, there are a network of sites, each containing a data source. The sites can each be under control of a separate resource managers. The entire collection of data at the multiple sites can be treated as a single distributed database. It is possible to have a transaction that can update any number of the distributed databases and can commit the transaction atomically. Such a transaction is called a "distributed transaction".

In a distributed database, in an implementation of the assignee of the present invention, a two-phase commit scheme is utilized for distributed transactions. In the first phase of a two-phase commit scheme, all databases surrender autonomy for a short period of time to hold resources necessary to commit or roll back a transaction as required. In the first phase, the various databases promise to commit or roll back when commanded by a master database. The second phase of the two-phase commit is the actual commit step. Each data source assigns its own local system commit number to its portion of the distributed transaction.

Because system commit numbers are established locally, it has not been possible to implement the read consistent scheme of a non-distributed database in a distributed database environment. This is because it is not meaningful to compare the system commit number of a read operation to a plurality of different system commit numbers at each database. It is possible that committed data in one database may have a system commit number higher than the system commit number of the read operation. In that case, the transaction is provided with old data instead of the most currently available data at the time the read operation was initiated.

Shipley, U.S. Pat. No. 4,819,159, describes a distributed, multi-process on-line transaction processing system employing multiple concurrent processors communicating by conventional LAN links. In one embodiment, Shipley provides fault tolerance to the system. The system is transaction based, where each transaction is treated atomically. The atomicity of transactions is ensured by establishing a transaction coordinator, which maintains a log of the distributed file access required during processing of a transaction, combined with file and block level locks to prevent other transactions from altering the data at inappropriate times during processing. During processing, a consistent view of all required files is maintained.

The commit process of Shipley implements a two-phase commit during a disk write. During phase one, the transaction coordinator sends commit messages to each file system involved in the transaction, and corresponding I/O servers send acknowledge signals to the coordinator. In phase two, the transaction coordinator writes to the log, committing the transaction. Shipley does not log prepare and commit times for each transaction to ensure distributed read consistency. Additionally, Shipley does not disclose row level locking capable of writing locking information as the transaction proceeds, and is not applicable to read and write operations.

U.S. Pat. No. 4,569,015 to Dolev provides a method for achieving Byzantine Agreement among active network processors to execute atomically a task distributed among them even in the presence of detected faulty processors. The Byzantine Agreement method of Dolev is applied to a two-phase commit protocol in one embodiment. The two-phase commit requires the following steps:

(1) designating one node as a transaction coordinator and broadcasting a "prepare-to-commit" at time t message to all participating processors;

(2) each processor responding to this message by either logging a "prepared" record and voting "yes," or aborting and voting "no;"

(3) broadcasting the event "commit" or "abort" using the inventive method if votes received by the transaction coordinator by time t+2o so dictate; and (4) aborts if a processor has not decided to commit by time t+6o.

Dolev does not log prepare and commit and start times for each transaction, and does not use row level locking. Further, Dolev is directed toward ensuring consistency after a fault and not to a system for providing distributed read consistency.

Thompson, U.S. Pat. No. 4,881,166, discloses a concurrence control that ensures the correct execution of multiple concurrent global transactions in a distributed database system along with independent concurrent execution of local transactions at each site. Thompson uses a two-phase commit protocol between the servers and the local databases to commit the updates performed by the global transactions on the global database. Thompson monitors possible inconsistency conditions between transactions, and prevents a transaction from executing as long as an inconsistency or deadlock is possible.

If the end time for transaction T does not fall between the start and end time for any other involved transaction, then transaction T is allowed to execute, since no possibility of a deadlock or inconsistency may occur. Instead of logging the prepare and commit times for each transaction, only the start and end times of each transaction are logged. Although the method of Thompson does ensure read and write consistency in a distributed database, Thompson does not disclose any method of locking, and does not disclose row level locking capable of writing locking information as the transaction proceeds.

Ecklund, U.S. Pat. No. 4,853,843, presents a system for merging virtual partitions on an objected-oriented, distributed database system following failure between sites accessing the database. Following restoration of site communication, the virtual partitions are merged to form a consistent merged database. Ecklund does not log prepare, commit and start times for each transaction, and does not disclose any method of locking data to ensure distributed read consistency.

U.S. Pat. No. 4,949,251 to Griffin discloses a method for ensuring a transaction occurs atomically on a distributed system, even where there is a partial system failure during the transaction. Every transaction is assigned a unique identification number and placed on a task queue. The I.D. number is made up of the current logical time concatenated with the processor identification number. As each transaction is performed the transaction's task I.D. is written into each updated database. During recovery from a partial system failure, Griffin compares the current task I.D. to the pre-existing task I.D.'s written into each database to see if the database has already performed the current task. If so, Griffin aborts the current transaction without performing further updates. In this way, every transaction is completed exactly once even after a system failure. Although Griffin assigns I.D.'s to each transaction, and these I.D.'s include the start times of each transaction, Griffin does not log prepare and commit times of the two-phase commit associated with the transaction. Further, Griffin does not disclose any method of locking to ensure data consistency during a distributed read.

U.S. Pat. No. 4,868,166 to Reinsch describes a method of restarting a fault-tolerant system without requiring the writing of images of loaded records to the log. Instead, the method of Reinsch logs only a minimal amount of information, recording positions within data sets to be moved and within the tablespace to be loaded. Reinsch is directed toward improving the load operation during a system recovery. Although Reinsch does disclose a two-phase commit, it does not disclose a method of accomplishing the two-phase commit, and does not provide a method for ensuring distributed read consistency.

Jenner, U.S. Pat. No. 4,648,031, is directed toward a method for restarting a failed computer subsystem, or a subset of that subsystem. In Jenner, the invention keeps track of all work to be done upon restart and all available system resources, and selectively restarts certain resources while deferring the restarting of other resources until they become available. Recovery is based on check-pointed information recorded on a recovery log. The method of Jenner does not disclose a method of accomplishing a two-phase commit, and does not provide a method for ensuring distributed read consistency or row level locking.

Daniell, U.S. Pat. No. 4,620,276, discloses a method for asynchronously processing replication messages between nodes in a distributed multiprocessor system. In the Daniell invention messages received at each node are processed normally, or else discarded, in the order of their receipt at the node. Daniell is designed to take the place of synchronous message processing protocols, such as the two-phase commit. In fact, Daniell states that, using the method described, no two-phase commit need be implemented to assure consistency between paired nodes.

Four concurrency control protocols are described in Weihl, "Distributed Version Management for Read-Only Actions", *IEEE Transactions on Software Engineering*, Vol. SE-13, No. 1, January 1987. The protocols work by maintaining multiple versions of the system state. Read only actions read old versions of the data, while update actions manipulate the most recent version. The scheme of Weihl uses read locks on data that is read within an update transaction. In addition, Weihl requires complicated algorithms for tracking old versions of data.

SUMMARY OF THE INVENTION

The present invention describes a method and apparatus that forces all parts of an update transaction to commit automatically using a two-phase commit. The present invention uses the two-phase commit messages to negotiate a system commit number (SCN) that is then recorded on each of the nodes as the logical point in time that the distributed transaction committed. The two-phase commit scheme of the present invention consists of a "prepare" phase and a "commit" phase. The transaction in the distributed database environment involves multiple participants (databases). In the prepare phase, one of the N database participants is selected as the "commit point." The commit point includes the log into which the information is written that states the transaction has committed. The remaining N−1 participants enter a "prepare phase." In the prepare phase, the prepare participants record the transaction ID, the current local system commit number, the identity of the commit point, (or of other participants that will have recorded the identity of the commit point), in the log, and force the log to stable storage.

The mid-point of the two-phase commit is the point at which the commit point database (nth participant) writes the commit transaction to its log. In the second phase, the remaining participants are informed to commit the transaction and release locks that have been set.

The present invention allows a transaction to read a consistent version of the database. A transaction sees only committed data from other transactions, plus its own updates. As transactions commit, a commit number is assigned and a transaction sees only data with a commit number less than or equal to the system commit number at the time the read operation is initiated.

DETAILED DESCRIPTION OF THE INVENTION

A method and apparatus for a two-pass multi-version read consistency is described. In the following description, numerous specific details are set forth in detail in order to provide a more thorough description of the present invention. It will be apparent, however, to one skilled in the art, that the present invention may be practiced without these specific details. In other instances, well known features have not been described in detail so as not to obscure the present invention.

A distributed database is a database that is not stored in its entirety at a single physical location. Rather, a distributed database is database that is stored across a network of locations that are connected via communication links. A distributed database consists of a collection of sites or nodes, connected together into a communication network. Each of the sites is an independent database in itself with its own local database manager.

Figure 1:
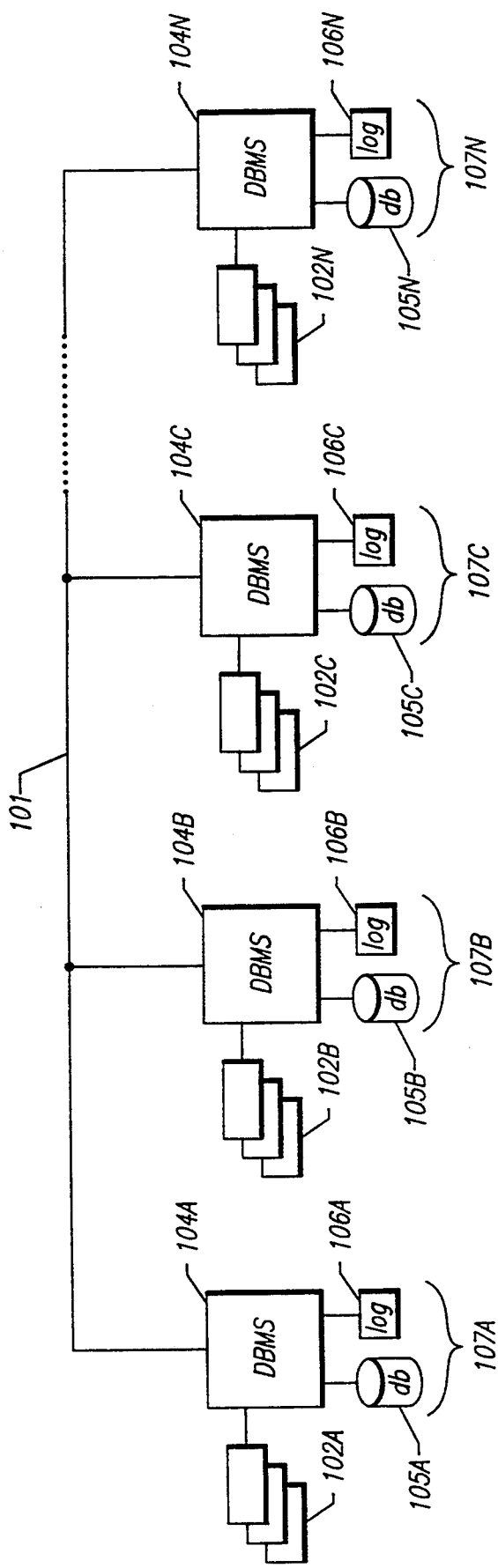
FIG. 1 is a block diagram of a distributed database of the present invention.

A block diagram of a distributed database is illustrated in FIG. 1. One or more clients, such as clients 102a–102N, access distributed database sites through a communication channel, such as communication channel 101. The individual database sites, such as sites 107A, 107B, 107C and 107N are thought of collectively as a single distributed database. The communication channel 101 may be a computer bus, a wire connection, a telephone line or a wireless communications medium. Each database site includes a database manager such as database manager 104A of site 107A, a database 105A, and log 106A The log 106A is used to log transactions for that database, so that if there is a failure, the database can be restored to a prior known condition.

Each of the clients, such as 102A, is associated with a particular database manager. However, each client may access any of the other databases in the distributed database system through the communications channel 101.

In the distributed database system, each database has its own means for generating its own system commit number. Therefore, there is not necessarily any relationship between the system commit number of one database and the system commit number of another database. Often, the system commit number generating means are tied to a local clock and are incremented synchronously with the clock. However, since each local clock is independent, there is no consistency between the system commit numbers of the distributed databases.

DISTRIBUTED TRANSACTION

A distributed transaction is a transaction that affects data in more than one distributed database, or reads data from more than one database. A distributed transaction can result in different system commit numbers being assigned to different parts of the same transaction. For example, consider a distributed database system that tracks financial transactions. A funds transfer operation of $100.00 requires a transaction to debit an account in one database by $100.00, credit an account in another database by $100.00 and then commit. It is possible that the credit portion of the transaction could be assigned a system commit number of 9, for example, and the debit portion of the transaction could be assigned a system commit number of 11.

DISTRIBUTED QUERY

In the case of a distributed database, there is a situation where a reading transaction or a query statement might be decomposed into statements that are then provided to various databases in the network. This is referred to as a "distributed query." A distributed query is a query that reads one or more data items that are located in more than one database in the distributed database. In the ideal case, the number of debits and the number of credits should balance. However, if a distributed query asked for a restore or read as of system commit number 10, then it would be possible to read the credit portion of the transaction, but not read the debit portion of the transaction. After such an operation, $100 is unaccounted for. Therefore a distributed query could read an inconsistent state of the database. For purposes of example, assume that the next available system commit number in each database is as follows:

TABLE 1

| Database | 105A | 105B | 105C | 105N |
|---|---|---|---|---|
| SCN | 10 | 14 | 11 | 12 |

Also assume that the most recent transaction in databases 104A and 104B was a debit/credit operation. Now assume that a read operation is initiated at database 104C that is to read all of the other databases. The system commit number at database 104C is 11. Thus, the read operation can only view data with a system commit number of 11 or lower. Therefore, the debit transaction of database 104A can be read since the system commit number of 10 is lower than the system commit number of 11 of database 104C. However, the credit transaction of database 104B cannot be read, since its system commit number of 14 is higher than the system commit number of database 104C. This "splitting" of a distributed transaction due to the inconsistency of the system commit numbers results in errors.

Figure 2:
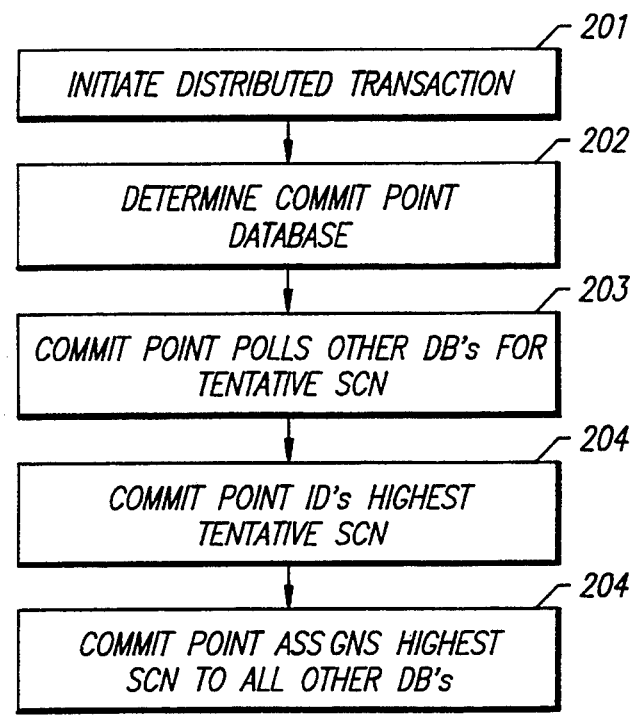
FIG. 2 is a flow diagram illustrating the operation of the present invention.

The present invention provides a method and apparatus for providing read consistency in a two pass multi-version environment. In the present invention, system commit numbers are still set by each local database for non-distributed transactions. However, for a distributed transaction, one of the local databases is established as a commit point database. This commit point database then polls the other databases for the system commit number each is tentatively planning to assign to its portion of the distributed transaction. This polling does not result in extra messages, the system commit numbers from the n−1 participants are provided in the same message that provides the acknowledgement that informs the commit point database that the participants are in the prepared state. The commit point database identifies the highest of these proposed system commit numbers and negotiates with each local database to use that highest system commit number instead of its own proposed system commit number. In this manner, all distributed transactions have a consistent system commit number across the local databases. After a distributed transaction, each local database uses only future system commit numbers that are higher than the assigned system commit number in a distributed transaction A flow diagram illustrating the operation of the present invention is illustrated in FIG. 2. At step 1, a distributed transaction is initiated. At step 202, the commit point database of the distributed transaction is determined. At step 203 the commit point database polls the other databases for a tentative system commit number. That is, each data base informs the commit point database of the system commit number it proposes to use for the distributed transaction. At step 204, the commit point database identifies the highest tentative system commit number from the selections provided by the other databases. At step 205, the commit point databases assigns the highest system commit number to all the other databases, regardless of the proposed system commit numbers of the other databases.

In a system utilizing the present invention, the system commit numbers of some or all of the local databases are periodically synchronized, (during a distributed transaction). However, there is no requirement for synchronization of the local databases between the occurrence of distributed transactions. This simplifies operation of the present invention.

Consider again the example of Table 1. In a distributed transaction that involves all local databases 105A-105N, consider that local database 105A is the commit point database. Database 105A polls the remaining databases for their system commit numbers for the distributed transaction. The proposed system commit numbers of databases 105B-105N are 14, 11 and 12, respectively. The proposed system commit number of commit point database 105A is 10.

Commit point database 105A identifies the highest of the highest proposed system commit number as system commit number 14 of database 105B. Commit point database 105A then sets its own system commit number to be 14 and instructs databases 105C and 105N to use system commit number 14 for the distributed transaction, as well. The system commit numbers of each database then appear as below in Table 2.

TABLE 2

| Database | 105A | 105B | 105C | 105N |
|---|---|---|---|---|
| SCN | 14 | 14 | 14 | 14 |

Subsequent transactions at the local level (i.e., non-distributed transactions) are assigned system commit numbers based on local parameters only, with no dependency on the system commit numbers of other local databases. Consider a distributed read operation initiated by database 105A. The system commit number of such a distributed read operation is, for example, 15. Thus, the read operation will view data in each database having a system commit number of less than 15. Therefore, all elements of the distributed transaction having a system commit number of 14 will appear to the read operation as committed data and all will be read by the read operation. Thus, a consistent distributed read operation is provided.

Figure 3:
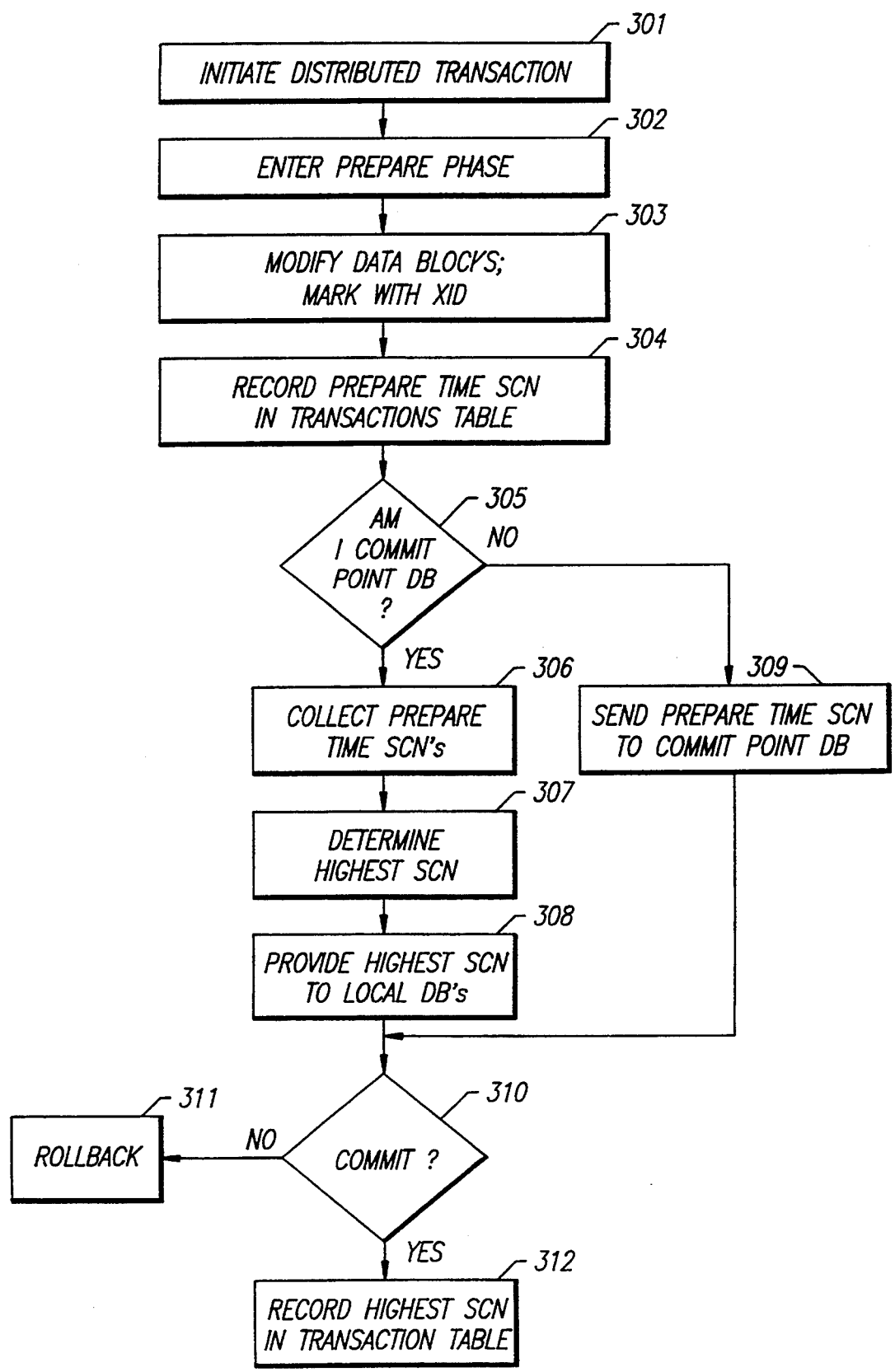
FIG. 3 is a detailed flow diagram of the operation of the present invention.

A detailed flow chart of the operation of the present invention is illustrated in FIG. 3. At step 301, a distributed transaction is initiated. At step 302, the local database enters the prepare phase. At step 303, the local database modifies a data block and marks that data block with a transaction ID (XID). At step 304, each local database records the prepare time system commit number in a transaction table.

At decision block 305, the argument "Am I commit point database?" is made. If the argument is true, the system proceeds to step 306 and the commit point database collects the prepare time system commit numbers from the other local databases involved in the distributed transaction. At step 307, the commit point database determines the highest system commit number and at step 308, the high system commit number is provided to the local databases. If the argument at decision block 305 is false, the system proceeds to step 309 and each local database sends its prepare time system commit number to the commit point database. The commit point database after step 308 and the local database after step 309 proceeds to decision block 310. At decision block 310, the argument "Commit?" is made. If the argument is false, the transaction is not committed and the system rolls back at step 311. If the argument at decision block 310 is true, the system proceeds to step 312 and records the highest system commit number in the transaction table as the commit number for that transaction.

In some schemes, the system commit numbers are generated by incrementing counters. When a local database receives an assigned system commit number from the commit point database that is higher than its local system commit number, it resets its counter to be greater than the higher value so that subsequent transactions have a higher system commit number. Another scheme for implementing system commit numbers is to use a local physical clock that can be adjusted forward. For example, the prepare phase system commit number of step 304 is referred to as time $T_p$. The commit time system commit number is a current logical clock value referred to as $T_c$. In the present invention, explicit read-only transactions are assigned a start time $T_s$, (less than the current system commit number counter value).

Figure 4:
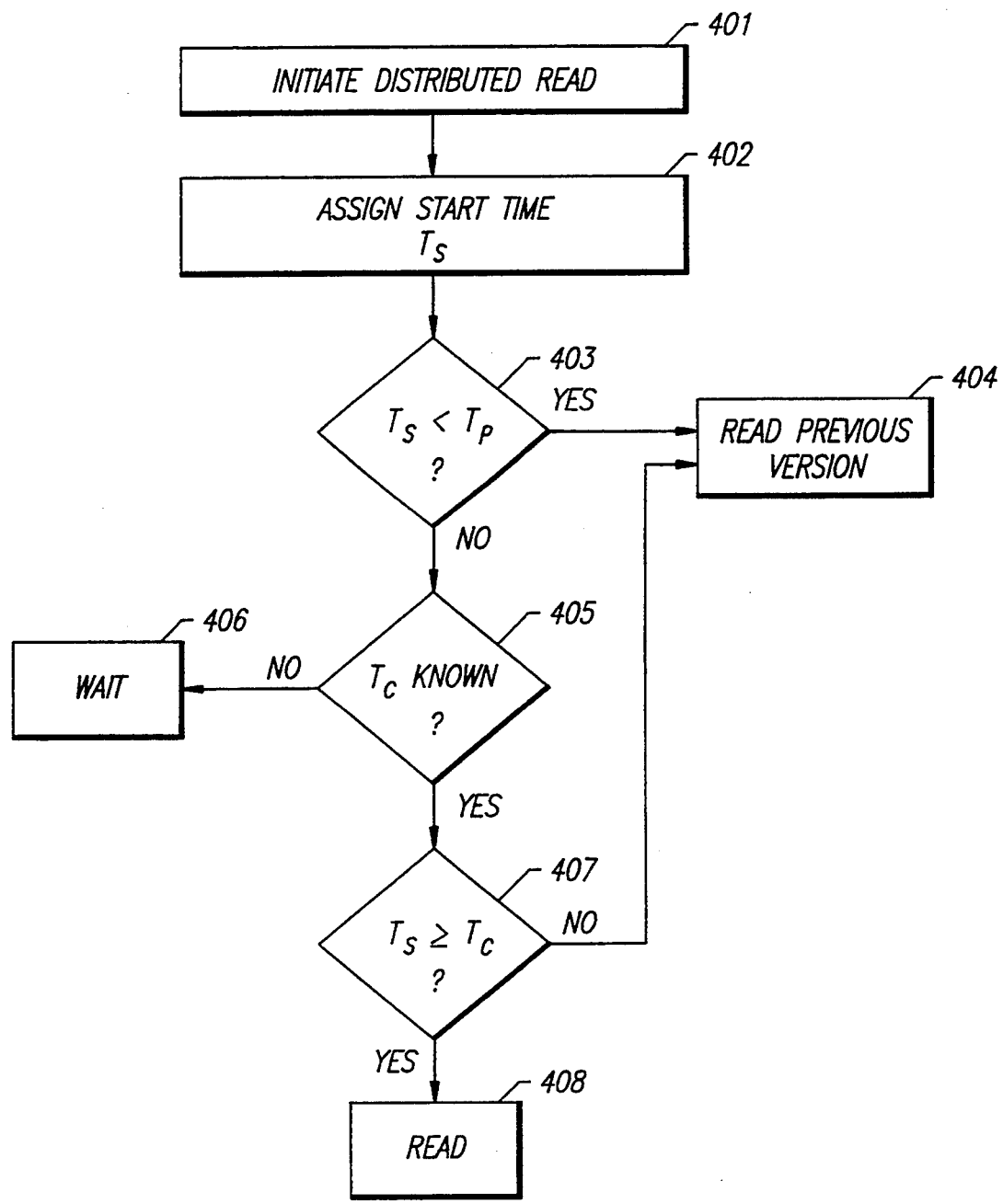
FIG. 4 is a flow diagram of a read operation in the present invention.

A flow diagram illustrating a distributed read operation in the present invention is shown in FIG. 4. At step 401, a distributed read operation is initiated. At step 402, a start time $T_s$ is assigned to the transaction. At decision block 403, the argument "$T_s < T_p$?" is made. If the argument is true, meaning that the start time is prior to the prepare phase system commit number of a particular data block, then the read operation cannot read that block of data and proceeds to step 404 and attempts to read a previous version of the data. If the argument at decision block 403 is false, the system proceeds to decision block 405.

At decision block 405, the argument "$T_c$ known?" is made. If the argument is false, meaning $T_c$ is unknown, the read operation cannot be sure if the data is committed. Therefore, the system proceeds to step 406 and the read operation must wait until $T_c$ is known before reading that data block. If the argument at decision block 405 is true, the system proceeds to decision block 407. At decision block 407, the argument "$T_s \geq T_c$?" is made. If the argument at decision block 407 is true, that means that the data has committed prior to the read operation beginning and the system proceeds to step 408 and the data is read. If the argument at decision block 407 is false, the data has not committed as of the time of the start of the read operation and the system returns to step 404 and reads the previous version of the data.

Figure 5:
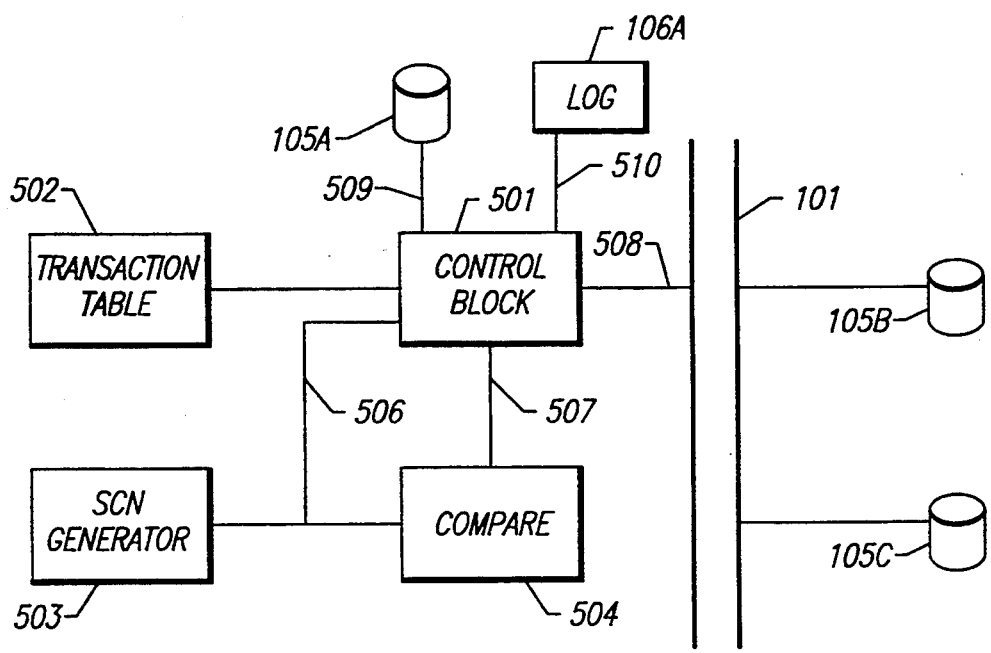
FIG. 5 is a block diagram of a local database controller in the present invention.

A block diagram of a local database manager utilizing the present invention is illustrated in FIG. 5. A control block 501 is coupled to a transaction table 502 through connection 505. The control block 501 is also coupled to SCN generator 503 and compare block 504 through lines 506 and 507 respectively. The SCN generator 503 is also coupled to the compare block 504 through line 506. The control block 501 accesses local database 105A and log 106A through lines 509 and 510 respectively. Control block 501 communicates with other databases, such as databases 105B and 105C, through a communication channel 101.

The control block 501 receives requests for transactions from a client and enters the prepare phase. The control block 501 modifies data in the local database 105A and marks the data block with a transaction ID (XID) before entering the prepare phase. The control block then records a prepare phase system commit number in transaction table 502. A prepare phase system commit number, $T_p$, is provided by the SCN generator 503. As previously noted, the SCN generator 503 may be an incrementing counter, a logical clock, or any other means for generating increasing system commit numbers. If the transaction is a distributed transaction and distributed read and write operations, the prepare phase system commit number is transmitted to the commit point database through communication channel 101.

The control block 501 receives a commit phase system commit number from the commit database through communication channel 101. This system commit number is compared to the prepare phase system commit number in compare block 504. If the SCN provided by the commit point database is higher than its own SCN, the control block resets the SCN generator to be consistent with the new higher SCN. This insures that subsequent system commit numbers generated are higher than the selected SCN for that transaction. If the transaction commits, the commit phase system commit number is recorded in the transaction table 502.

When the control block 501 is acting as a commit point database, prepare phase system commit numbers from one or more local databases involved in the distributed transaction are compared in the comparing means 504. The highest SCN is selected as the system commit number for that transaction and broadcast to the other databases participating in the distributed transaction.

The present invention has the benefits that less disk I/O is required for prepare phase. This is because the invention only locks rows that are updated. Part of the update information written to stable storage is the lock information. Therefore, row locks are written to disk and written to the log along with the update information. This occurs as the transaction progresses with no additional overhead at prepare time. In prior art, locks that are held in memory must be logged during the prepare phase.

The novelty of the invention lies in the fact that no additional locks have to be logged during the protocol, it applies to both read and write operations and distributed write operations.

The locking scheme of the present invention does not use any read locks. Instead, the present invention processes an SQL update or delete statement optimistically.

1. Let S be a savepoint of the database.
2. Using the most recent version of the database, select (i.e. read), the rows to be updated.
3. For each row:
   case 1: the row is the most recent version; update the row and set a write lock on that row.
   case 2: the row is not the most recent version;
      a. i.e, another transaction update the row between steps 2 and 3, (because it has not yet been locked).
      b. rollback the transaction to savepoint S, (undo all updates in this transaction performed in case 1).
      c. perform the select in step 2 again, this time acquiring write locks on each row.
      d. perform the update.

Write locks are stored on disk, (a few bits for each row). This eliminates the need for "escalation". In prior art schemes, where locks are kept in RAM, if locks are placed on a number of rows in a block, memory becomes unavailable, so the entire block is locked, replacing the plurality of row locks. This prior art scheme leads to poor concurrency and deadlocks.

The locking scheme of the present invention, by writing locks to disk, avoids escalation. It also eliminates additional overhead of writing lock information to disk during the prepare phase of a transaction. The present invention prevents each updated row from being written twice, (once to lock, and once to update). If case 1 is always true, the locking and updating are combined. In the present invention, reads do not wait for writes, and writes do not wait for reads.

The present invention also provides distributed recovery to a consistent state at a given point in time. Consider the case where there is an association between the system commit number and a clock at any local database, and it is desired to restore the local database to its state at a time just prior to the accidental loss of a large block of data, (or to any other time). It is possible to restore a backup copy of the local database, and replay the log up to the desire system commit number. At this point, the distributed database is inconsistent because the local database does not reflect any updates made after the system commit number to which it has been restored. However, because the system commit numbers are coordinated, it is possible to repeat the procedure applied to the local database to the other databases in the distributed database, thereby restoring consistency.

The two-phase commit/SCN negotiation algorithm also works on a tree-structured network where not all databases can contact other databases. The diagram of FIG. 1 is the case where any database can establish a connection with any other. Another possibility is shown in FIG. 6.

Figure 6:
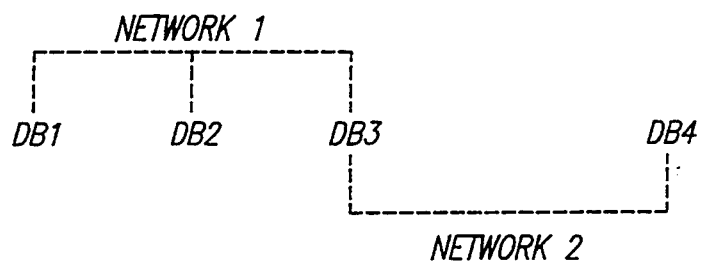
FIG. 6 illustrates a distribution database.

In FIG. 6, DB1 and DB2 cannot establish connections to DB4. This is because they do not share a common network protocol or the two networks have different security or operational characteristics that prohibit combining. For example, network 1 might be a high speed local area network, and network 2 might be a telephone connection from DB4, which is a database on a portable computer. DB3 can communicate with databases DB1 and DB2 and with database DB4.

The protocol of this invention permits all four databases to participate in a distributed transaction. DB3 mediates access from the databases on one network to the databases on another. This gives rise to a "transaction tree" or databases, that reflects the data access patterns in the transaction.

Figure 7:
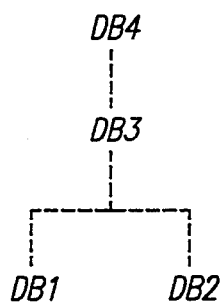
FIG. 7 illustrates a transaction tree.

For example, if DB4 is to update all four databases, it would update DB3 and DB4 directly, and instruct DB3 (by invoking a stored procedure at DB3 that contained remote update statements to DB1 and DB2, for example) to update DB1 and DB2. The "transaction tree" would appear as in FIG. 7.

Figure 8:
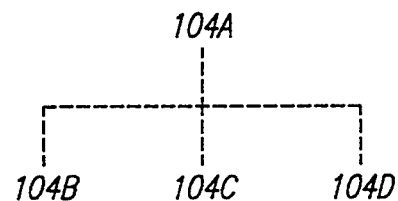
FIG. 8 illustrates a database structure of FIG. 1.

The transaction tree is a "logical" grouping of the databases involved in a transaction. It is constrained by the physical organization of the computers and networks, but many different transaction trees are possible with a single physical organization. All tree structures are possible if all databases are directly connected as in FIG. 1, but in this case, generally the transaction trees are "flat," with the client DB at the root and all other referenced databases at the leaves, directly connected to the root, as shown in FIG. 8.

Using the C language, comments, and pseudocode, the following describes the combined two phase commit and system commit number negotiation scheme. Types are defined as follows:

```
enumCOMMAND                    /* commands for two-phase commit */
{
abort, prepare, request_commit, read_only, commit, forget
}
enum STATE                     /* states of a distributed transaction at each participant */
{
idle, prepared, committed
}
```

Each database, for each transaction, maintains a variable in stable, persistent storage named tran_state of type STATE. The tran_state and other information concerning each transaction comprises a record in one or more transaction_table data structures per database.

```
struct SCN                     /* the System Commit Number */
{
```

```
unsigned long hi_bytes;
unsigned long low_bytes,
}
const SCN nullscn = {0,0};        /* a distinguished, "undefined" SCN value */
```

Let us say that the relational operators $<$, $\leq$, $==, !=, >$, and $\geq$ are defined on the type SCN. Also, let the assignment operator, $=$, be defined.

Note the system commit number is capable of representing a number much larger than a trillion, and so is effectively infinite (useful for thousands of years without needing to "wrap around" to zero).

Each database maintains a variable in memory named db_scn of type SCN. Although in memory, it is protected with latches or other means from concurrent access by more than one transaction. It is also possible to recover, after a failure that results in loss of memory, a new db_scn that is higher than the current db_scn at the time of the crash. (One way to recover is to write the db_scn to stable storage each time it is advanced past a multiple of some number, e.g. 1000.)

Each database, for each transaction, also maintains two variables in stable, persistent storage named tran_prepare_scn and tran_commit_scn. Like the tran_state variable, these variables are part of a record in a transaction_table.

When invoked by the client to commit a distributed transaction, the local state is idle, and the COMMAND parameter is read_only. The same function is invoked on each database involved in the distributed transaction, using the method of "remote procedure call".

Note that the databases involved in a distributed transaction form a tree, with the client database at the root of the tree. Thus, the function "two_phase_commit" is first invoked at the root database, then the local invocation of said function issues remote invocations of the "two_phase_commit" function to its "children" (immediate descendants in the tree) databases, and those children may recursively do the same for their children, etc., until said function is invoked at the leaves.

Figure 9:
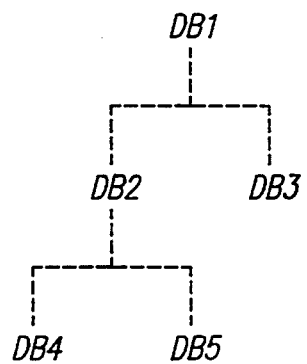
FIG. 9 illustrates a distributed transaction tree.

Referring to FIG. 9, DB1 is the root or client database. DB2 and DB3 are children of DB1, and DB4 and DB5 are children of DB2. We say DB3, DB4, and DB5 are leaf nodes. Let the expression "has_children()" evaluate to TRUE at DB1 and DB2, and evaluate to FALSE at DB3, DB4, and DB5. Furthermore, let the expression get_children() evaluate to the set {DB2,DB3} at DB1, and {DB4,DB5} at DB2, and {}(empty set) at DB3, DB4, and DB5.

In each such "transaction tree", there is exactly one database that is the "commit point". The commit point does not enter the prepared state, and determines the SCN of the transaction. This SCN is then communicated to the other databases that are not the commit point, and thus are in a prepared state.

Each database can indicate its propensity to be the commit point by returning a numeric weight to its parent database when the network connection is first established. Each database can therefore decide, without further communication, whether it or one of its children should be the commit point. If a child is elected, then that child must decide among itself or one of its children. As an example of this recursive process, assume the following table of commit point weights for the above transaction tree:

| Database | Commit Point Weight |
|----------|---------------------|
| DB1      | 1                   |
| DB2      | 2                   |
| DB3      | 1                   |
| DB4      | 3                   |
| DB5      | 1                   |

DB1 will decide that DB2 should be the commit point. But DB2 will decide that DB4 should actually be the commit point. In the following code, the expression "is_commit_point()" returns TRUE if the local database has a higher commit point weight than all children. The expression "is_commit_point(child)" returns true if the child database parameter has a higher weight than other children or the local database. In the case of a tie, one of the tying weights is picked at random and incremented. The expression "get_commit_point_child()" returns the child database "db" for which "is_commit_point(db)" is TRUE. The following is a pseudocode function definition for get_commit_point_child:

```
database get_commit_point_child()
{
  foreach db in get_children()
  {
    if (is_commit_point(db)) return db;
  }
  return NULL;
}
```

In the following code, the SCN negotiation is "piggy-backed" on the two phase commit messages. In the following code, a message is encapsulated in a remote procedure call, or RPC. An RPC is indicated by the following pseudocode:

execute at <database>: <statement>;

Often, the same RPC is invoked at all child databases.

```
foreach db in get_children()
{
  execute at db: <statement>;
}
```

In this scheme, "read only optimizations" are implemented. Note that transactions that are read only and transactions that are rolled back only need one phase, not two. Such transactions do not require coordinated SCNs.

The two_phase_commit function makes use of two sets of subroutines. One set is prefixed with local_ and affect the local database and its log. The other set is prefixed with child_ and affect the remote child databases, usually by calling two_phase_commit at each child and combining the return COMMAND result.

```
COMMAND two_phase_commit_(COMMAND command, SCN *scn)
/*
Note that the scn parameter is passed "by reference", so it can be both an
input and output parameter.
*/
{
  COMMAND result;              /* holds the result of this function */
  /* adjust the local db_scn if needed */
  if (*scn > db_scn) db_scn = *scn;
  /* only the commit command (2nd phase of 2PC) can pass an scn in */
  if (command != commit) *scn = nullscn;
  switch(tran_state)
  {
  case idle:
  /*
      The transaction at this database is in idle state, i.e. this is the
      start of the first phase of the protocol.
  */
      switch(command)
      {
      case read_only:                                 /* parent database
  or "user" requests commit */
        switch(child_prepare())         /* first, prepare non-commit-point children */
        {
        case abort:          /* at least one child vetoed the commit */
          local_abort();                              /* rollback this database */
          result = child_abort();       /* and all children that did prepare */
          goto ret;
        case read_only:                  /* all children voted read-only */
          if (is_commmit-point())       /* this database is the commit point */
            switch(result = local_commit(scn, TRUE))  /* commit this database */
            {
            case read-only:   /* this database and its children read only */
            case commit:                              /* this database did updates */
              goto ret;     /* end of 1st phase at this database */
            case abort:       -- /* this database could no commit */
              child_abort();                          */ rollback prepared children */
              goto ret;
            }
          else              /* a child must be the commit point */
            switch(local_prepare(TRUE))               /* prepare this database */
            {
            case read_only:                /* this database did no updates */
            */
              issue RPC to commit point child
            */
              execute at get_commit_point_child():
                result = two_phase commit(read_only, scn);
              goto ret;                   \/* return the result of the RPC */
            case request_commit:          /* this database did updates */
              break       /* execution resumes in prepared state case */
            case abort.                   /* this database vetoed the commit */
              result = child_abort();     /* rollback prepared children */
              goto ret;
            }
          break;
        request_commit_case:
        case request_commit.              /* some children did updates, none vetoed */
        /*
            note that in this case, no read_only optimization is possible
        /*
          if (is_commit_point())          /* this database is the commit point */
            switch(local_commit(scn, FALSE))          /* commit this database */
            {
            case commit:
              goto committed_state;
            case abort.
              result = child-abort();
              goto ret;
            }
          else              -- /* a child is the commit point */
            switch(local_prepare(FALSE))              /* prepare this database */
            {
            case request_commit:
              break;
            case abort:
              result = child-abort();
              goto ret;
            }
          }
          break,
        case request_commit:              /* idle state, command == request_commit */
```

```
    switch(child_prepare())
{
case abort:                              /* some child vetoed commit */
    local_abort();                       /* rollback local updates */
    result = child_abort();              /* rollback prepared children */
    goto ret;
case read_only:
case request_commit:
    goto request_commit case,
}
    case abort:         /* parent database or "user" requests rollback */
        local_rollback();                /* rollback local updates */
        result = child_abort();          /* request children to rollback */
        got ret;
    case prepare:               /* parent database requests prepare */
        switch(child_prepare())          /* prepare children */
    case abort:                 /* some child vetoed commit */
        local_abort();                   /* rollback this database's updates */
        result = child_abort();          /* rollback prepared children */
        goto ret,
    case read_only:             /* no children did updates */
        switch(result = local_prepare(TRUE))    /* prepare this database */
        {
        case abort:                      /* this database vetoed commit */
          child_abort();                 /* abort prepared children */
            goto ret;
            case read_only:    /* this database and children did no updates */
            case request_commit:         /* this database did updates */
              goto ret,
        }
        case request_commit:             /* no read only optimization allowed */
            switch(local_prepare(FALSE))         /* prepare this database */
            {
            case abort:                  /* this database vetoed commit */
              result = child-abort();            /* abort prepared children */
              goto ret;
            case request_commit:   /* this database or children did updates */
              result = request_commit;
              goto ret;
            }
        break,
    }
}
    case prepared:           /* this database in prepared state */
     switch(command)
     {
     case read_only:
     case request_commit:           /* some child must be commit point */
     /*
         invoke RPC at commit point child.
     */
        execute at get_commit_point_child():
        result = two_phase_commit(request_commit,scn);
        switch(result)                  /* examine RPC result */
        {
        case abort:                      /* child couldn't commit */
           local_abort();                /* rollback local updates */
           result = child_abort();       /* rollback prepared children */
           goto ret;
        case commit:        /* commit point committed, in 2nd phase */
           local_commit(scn, FALSE);         /* commit this database (2nd phase) */
           break;
        }
        break,
    case commit;                              /* 2nd phase */
     local_commit(scn, FALSE);           /* commit this database (2nd phase) */
     break,
        case abort:
    local_abort();                      /* rollback this prepared database */
     result = child_abort();             /* rollback prepared children */
     goto ret;
    }
    committed_state:
case committed:                         /* this database is committed */
     switch(command)
     {
     case request_commit
         child_commit(scn);
         result = commit;
         goto ret;
     case read_only:
         child_commit(scn);
```

```
        result = commit;
    case forget:
        if (!is__commit__point())
        {
            /*
            invoke RPC at commit point to forget the commit, so the
            remote transaction table entry can be reused. The committed
            state is no longer needed for recovery.
            */
            execute at get__commit__point__child(): two__phase__commit(forget, scn);
        }
        local__forget();                /* reset local state to idle */
        break,
    case commit:
        child__commit(scn);
        local__forget();
        break,
    }
}
ret:
if (command != request__commit) *scn = db__scn;
return result;
}
```

Following are the child__ subroutine descriptions.

```
child__abort()
{
    foreach db in get__children()
    {
        /*
        abort (rollback) the portion of the distributed transaction
        at each child database. Note the scn is not used for rollback.
        */
        execute at db: two__phase__commit(abort, nullscn)
    }
    return abort;
}
```

Following are the local__ subroutine descriptions.

```
void local__abort()
{
    Undo all updates in the current transaction at this database and
        release all locks;
    tran__state = idle;
    Force the redo log to stable storage;
}
COMMAND local__prepare(boolean read__only__ok)
{
    if (no local updates && read__only__ok)
        /* the tran__state is already idle */
        return read__only;
    /*
    else - all locks and undo/redo information have already been written
    to log buffers but not necessarily forced to stable storage
    */
    tran__prepare__scn = ++db__scn;          /* assign prepare time */
    tran__state = prepared;
    Force the log to stable storage;
    return request__commit;
}
COMMAND local__commit(SCN *scn, boolean read__only__ok)
{
    if (no local updates && read__only__ok)
        /* the tran__state is already idle */
        return read__only;
    /*
    else - all locks and undo/redo information have already been written
    to log buffers but not necessarily forced to stable storage
    /*
    if (*scn == nullscn)                         /* this database is the commit point */
        *scn = tran__commit__scn = ++db-scn;              /* assign commit time */
    else                                         /* use the scn from the commit point */
        tran__commit__scn = *scn;                /* so all databases have equal tran__commit__scns */
    tran__state = committed;
    Force the log to stable storage;
    return request__commit;
}
void local__forget()
{
    tran__state = idle;
    /*
    now, the transaction__table record containing this transaction can be
    reused by a new transaction. The current transaction is completely
```

-continued

```
finished, so no changes will ever be made to its transaction_table
record. However, the record for the current transaction is saved as
a version because it may need to be referred to when version of a
data block to present to a read operation that reads data modified
by the current transaction.
In other words, the transaction_table has multiple versions, which
are used to manage the versions of data blocks modified by those
transactions.
*/
}
Following are the child_subroutine descriptions.
COMMAND child_abort()          /* rollback aB child databases */
{
SCN scn,
foreach db in get_children()
{
scn = db_scn;
    execute at db: two_phase_commit(abort, &scn);
    /*
    The following just keeps the databases' db_scns more closely
    synchronized. There is no notion of synchronized rollback numbers.
    */
    if (scn > db_scn) db_scn = scn;
    }
    return abort;
    }
    COMMAND child_prepare()
    {
    SCN scn;
    COMMAND reply = read_only,
    child_reply;
foreach db in get_children()
{
if (!is_commit_point(db))      /* don't prepare a commit point */
{
scn = db_scn;
    execute at db: child_reply = two_phase_commit(prepare, &scn);
    if (scn > db_scn) db_scn = scn;
    switch(child_reply)
    {
    case abort:
        return abort,              /* one veto is enough to abort all */
    case read_only:
        break;                     /* all have to be read_only */
    case request_commit:
        reply = request_commit;    /* not read_only now */
    }
}
}
return reply;
}
    void child_commit(SCN *scn)    /* send 2nd phase commit to children */
    {
      SCN tmpscn,
      foreach db in get_children()
      {
    if (!is_commit_point(db))      /* don't send to a commit point */
    {
    tmpscn = *scn;
    execute at db: two_phase_commit(commit, &tmpscn);
    if (tmpscn > db_scn) = tmpscn;
    }
  }
}
```

Thus, a method and apparatus for providing two pass multi-version read consistency is provided.

We claim:

1. A method for executing a distributed transaction in a distributed database having at least first and second databases comprising the steps of:

generating a first system commit number associated with a first data block to be modified at said first database;

generating a second system commit number associated with a second data block to be modified at said second database;

comparing said first system commit number with said second system commit number;

defining said first system commit number as a transaction system commit number if said first system commit number has a value greater than said second system commit number;

defining said second system commit number as a transaction system commit number if said second system commit number has a value greater than said first system commit number;

providing said transaction system commit number to said first database and said second database associated with said first block of data and said second block of data.

2. The method of claim 1 wherein said distributed transaction is executed in a two phase commit protocol having a prepare phase and a commit phase.

3. The method of claim 2 wherein said first system commit number and said second system commit number are associated with said prepare phase of said transaction.

4. The method of claim 3 wherein said transaction system commit number is associated with said commit phase of said transaction.

5. The method of claim 4 further including the steps of:
initiating a read operation at said first database;
assigning a read operation system commit number to said read operation;
allowing said read operation to read a data block only when said read operation system commit number is greater than a system commit number associated with said data block.

6. The method of claim 5 wherein a system commit number associated with a prepare phase of a transaction is defined as $T_p$, a system commit number associated with a commit phase of a transaction is defined as $T_c$, and a system commit number associated with a read operation is defined as $T_s$.

7. The method of claim 6 wherein a read operation cannot read a data block when $T_s < T_p$.

8. The method of claim 7 wherein a read operation waits when $T_s \geq T_p$ and $T_c$ is unknown.

9. The method of claim 8 wherein a read operation reads a data block when $T_s \geq T_p$ and $T_s \geq T_c$.

10. The method of claim 9 wherein a read operation cannot read a data block when $T_s \geq T_p$ and $T_s < T_c$.

11. An apparatus for executing a distributed transaction in a distributed database having at least first and second databases comprising:
first system commit number generating means, said first system commit number generating means generating a first system commit number associated with a first data block to be modified at said first database;
second system commit number generating means, said second system commit number generating means generating a second system commit number associated with a second data block to be modified at said second database;
comparing means coupled to said first system commit number generating means and said second system commit number generating means, said comparing means comparing said first system commit number with said second system commit number;
controlling means coupled to said comparing means, said controlling means selecting a value for a transaction system commit number equal to the value of said first system commit number if said first system commit number has a value greater than said second system commit number;
said controlling means selecting a value for said transaction system commit number equal to the value of said second system commit number if said second system commit number has a value greater than said first system commit number;
transmission means coupled to said controlling means, said transmission means providing said transaction system commit number to said first database and said second database associated with said first block of data and said second block of data.

12. The apparatus of claim 11 wherein said distributed transaction is executed in a two phase commit protocol having a prepare phase and a commit phase.

13. The apparatus of claim 12 wherein said first system commit number and said second system commit number are associated with said prepare phase of said transaction.

14. The apparatus of claim 13 wherein said transaction system commit number is associated with said commit phase of said transaction.

15. The apparatus of claim 14 further including:
initiating means, said initiating means initiating a read operation at said first database;
said first system commit number generating means, said first system commit number generating a read operation system commit number to said read operation;
said comparing means comparing said read operation system commit number to a system commit number associated with said first data block;
said controlling means allowing said read operation to read said first data block only when said read operation system commit number is greater than said system commit number associated with said first data block.

16. The apparatus of claim 15 wherein a system commit number associated with a prepare phase of a transaction is defined as $T_p$, a system commit number associated with a commit phase of a transaction is defined as $T_c$, and a system commit number associated with a read operation is defined as $T_s$.

17. The apparatus of claim 16 wherein a read operation cannot read a data block when $T_s < T_p$.

18. The apparatus of claim 17 wherein a read operation waits when $T_s \geq T_p$ and $T_c$ is unknown.

19. The apparatus of claim 18 wherein a read operation reads a data block when $T_s \geq T_p$ and $T_s \geq T_c$.

20. The apparatus of claim 19 wherein a read operation cannot read a data block when $T_s \geq T_p$ and $T_s < T_c$.

* * * * *